United States Patent
Choi

(10) Patent No.: US 6,278,882 B1
(45) Date of Patent: Aug. 21, 2001

(54) CALL CONTROL METHOD IN BASE STATION OF CDMA MOBILE RADIO COMMUNICATION SYSTEM

(75) Inventor: Yong Su Choi, Kyungki-do (KR)

(73) Assignee: LG Information & Communications, Ltd., Seoul (KR)

(*) Notice: Subject to any disclaimer, the term of this patent is extended or adjusted under 35 U.S.C. 154(b) by 0 days.

(21) Appl. No.: 09/177,828

(22) Filed: Oct. 23, 1998

(30) Foreign Application Priority Data

Oct. 31, 1997 (KR) .............................. 1997-57412

(51) Int. Cl.[7] ...................................................... H04Q 7/20
(52) U.S. Cl. ......................... 455/453; 455/561; 455/436
(58) Field of Search ................................... 455/453, 445, 455/510, 513, 512, 561, 436, 438, 405, 26.1, 423, 424

(56) References Cited

U.S. PATENT DOCUMENTS

| | | | |
|---|---|---|---|
| 4,670,899 | * 6/1987 | Brody et al. | 455/453 |
| 5,241,685 | * 8/1993 | Bodin et al. | 455/453 |
| 5,245,629 | * 9/1993 | Hall | 455/522 |
| 5,276,907 | * 1/1994 | Meidan | 455/436 |
| 5,280,630 | * 1/1994 | Wang | 455/453 |
| 5,293,641 | * 3/1994 | Kallin et al. | 455/453 |
| 5,454,026 | * 9/1995 | Tanaka | 455/453 |
| 5,475,861 | * 12/1995 | Hall | 455/422 |
| 5,666,356 | * 9/1997 | Fleming et al. | 455/453 |
| 5,781,861 | * 7/1998 | Kang et al. | 455/442 |

(List continued on next page.)

OTHER PUBLICATIONS

Liu et al., "SIR–Based Call Admission Control for DS–CDMA Cellular Systems", IEEE Journal on Selected Areas in Communications, vol. 12 issue 4, pp. 638–644, May. 1994.*

Bambos et al., "Radio Link Admission Algorithms for Wireless Networks with Power Control and Active Link Quality Protection", 14th Anual Joint Conference of the IEEE Computer and Communication Societies, pp. 97–104, 1995.*

Saquib et al., "Optimal Call Admission to a Mobile Cellular Network", IEEE 45th Vehicular Technology Conference, pp. 190–194, 1995.*

Huang et al., "Call Admission in Power Controlled CDMA Systems", IEEE 46th Vehicular Technology Conference, pp. 1665–1669, 1996.*

Chang et al., "QOS–Based Call Admision Control for Integrated Voice and Data in CDMA Systems", 17th IEEE International Symposium on Personal, Indoor, and Mobile Radio Communications, pp. 623–627, 1996.*

Ishikawa et al., "Capacity Design and Performance of Call Admission Control in Cellular CDMA Systems", IEEE Journal on Selected Areas in Communications, pp. 1627–1635, Oct. 1997.*

*Primary Examiner*—William Trost
*Assistant Examiner*—Rafael Perez-Gutierrez
(74) *Attorney, Agent, or Firm*—Fleshner & Kim, LLP

(57) ABSTRACT

A call control method in a CDMA mobile radio communication system which can maintain the forward load in a sector below a predetermined level even when a forward sector capacity is overloaded by estimating the sector forward power using powers of activated traffic channels allocated to the sector when originating and terminating calls are controlled in the mobile radio communication system. According to the call control method, a forward sector excess capacity is calculated from the sector forward power for a predetermined period, a call and/or handoff call attempt block threshold value is determined using the calculated forward sector excess capacity, and then a call and/or handoff call is allocated by comparing the call and/or handoff call attempt block threshold value with the forward sector excess capacity value when a certain mobile unit requests a call allocation.

28 Claims, 4 Drawing Sheets

U.S. PATENT DOCUMENTS

| | | | | |
|---|---|---|---|---|
| 5,796,722 | * | 8/1998 | Kotzin et al. | 455/453 |
| 5,835,490 | * | 11/1998 | Park et al. | 370/342 |
| 5,859,838 | * | 1/1999 | Soliman | 370/249 |
| 5,884,174 | * | 3/1999 | Nagarajan et al. | 455/453 |
| 5,903,843 | * | 5/1999 | Suzuki et al. | 455/453 |
| 5,912,884 | * | 6/1999 | Park et al. | 455/453 |
| 6,002,676 | * | 12/1999 | Fleming | 370/328 |
| 6,044,072 | * | 3/2000 | Ueda | 455/453 |
| 6,064,892 | * | 5/2000 | Miyagawa et al. | 455/560 |
| 6,128,506 | * | 10/2000 | Knutsson et al. | 455/453 |

* cited by examiner

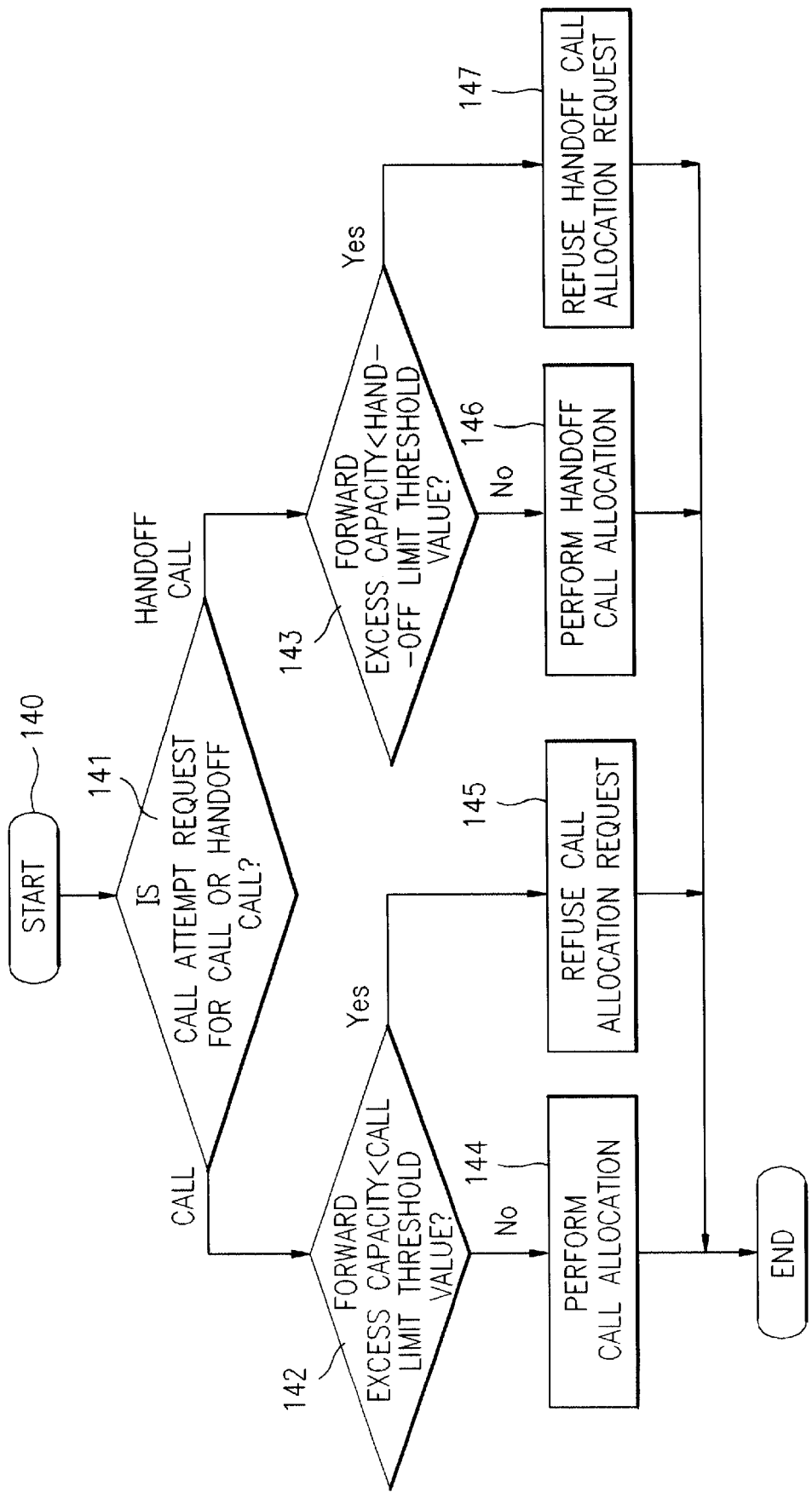

CALL CONTROL METHOD IN BASE STATION OF CDMA MOBILE RADIO COMMUNICATION SYSTEM

BACKGROUND OF THE INVENTION

1. Field of the Invention

The present invention relates generally to a CDMA (code division multiple access) mobile radio communication system. In particular, the present invention relates to a call control method in a base station of a CDMA mobile radio communication system which can maintain the forward load in a sector below a predetermined level by estimating the forward powers of activated traffic channels allocated to the existing sector and then by calculating the forward sector excess capacity when a respective base station of the mobile radio communication system controls the originating and terminating calls.

2. Description of the Related Art

A base station of a conventional mobile radio communication system is composed of a selector/vocoder module for performing a voice process and allocating forward traffic channel gains, a plurality of traffic channel elements for calculating the respective allocated powers, and a base station processor (BSP) for calculating the forward powers of the sector using the allocated power values received from the traffic channel elements and controlling the sector capacity accordingly.

Generally, it is important that the allocation of channels to new calls requested by new mobile units should be performed with the speech quality of the existing mobile units in use guaranteed if the new mobile units continuously request calls in a state that the existing mobile units are in use.

The maximum capacity of the forward link, whereby a specified speech quality can be guaranteed with respect to the calls being served as a plurality of mobile units in a sector are maintained in a serviceable state that they can process terminating and originating calls, is called a maximum forward sector capacity. If a load exceeding the maximum forward sector capacity exists in the sector, a pilot signal in the sector may disappear due to the traffic signal. Also, since the frame error ratio of the forward sector is increased, deterioration of the speech quality and the call release phenomenon may occur. The sector load which affects the forward sector capacity is increased and decreased by the number of the allocated calls, speech activity, forward control subchannel, etc.

A forward sector capacity control technique according to the number of calls and a high-power amplifier overload control technique 7 are known as conventional techniques relating to the sector capacity control.

The former is a method of controlling the sector capacity based on the number of activated calls which is being served in the sector. The latter is a method of controlling the sector capacity by monitoring the effective radiated power of the base station and preventing the malfunction of the high-power amplifier caused by overload, which is the base station output amplifier, based on its effective radiated power.

The conventional method of controlling the sector capacity according to the number of calls will now be explained in detail. According to this method, a fixed service block threshold value (the number of calls) is carried out by an experiment considering the sector output, propagation environments, etc. The service block threshold value may be classified into a call attempt block threshold value, a handoff attempt block threshold value, etc. The base station compares the total number of calls being served in the sector with the call attempt block threshold value whenever it receives the call attempt request from a mobile unit in the sector. At this time, if the total number of calls is smaller than the call attempt block threshold value, it allocates the call, while if the total number of calls is the same as or larger than the call attempt block threshold value, it puts the call attempt request in a standby state without allocating the call. Meanwhile, if a handoff request from an adjacent sector to the present sector is received, the base station compares the total number of calls being served in the sector with the handoff attempt block threshold value. At this time, if the total number of calls is smaller than the handoff attempt block threshold value, it allocates the handoff call, while if the total number of calls is the same as or larger than the handoff attempt block threshold value, it puts the handoff attempt request in a standby state without allocating the handoff call. The call attempt block and the handoff attempt block are released when the total number of calls becomes smaller than the respective threshold values by the normal completion of the calls in the sector, and at this time, the base station allows the call attempt request and the handoff attempt request of the sector.

However, according to the conventional sector capacity control method according to the number of calls, since the respective sectors have different propagation environments from one another, and the maximum numbers of calls serviceable in the respective sectors are different accordingly, the service block threshold values according to the number of calls in the respective sectors are also different from one another. Also, since the number of subscriber's calls serviceable in the sectors are not absolute, they are insufficient to be used as the basis of judgement on the sector capacity control.

Meanwhile, the conventional method of controlling the overload of the high-power amplifier will now be explained. According to this method, a specified service block threshold value at the final output terminal is determined considering the maximum output of the high-power amplifier which is the base station output amplifier. The service block threshold value may be classified into a call attempt block threshold value, a handoff attempt block threshold value, etc. The base station always monitors the effective radiation output of the sector at the final output terminal, and compares the output of the sector with the call attempt block threshold value and the handoff attempt block threshold value, respectively. The base station allows or bars the call attempt and the handoff attempt according to the result of comparison.

However, the conventional high-power amplifier overload control method has the drawback that the output of the sector is abruptly reduced in case that the high-power amplifier is overloaded and operates abnormally, and this causes the calls being served in the sector to be released. In other words, since the object of the overload control function performed by the high-power amplifier is to protect the high-power amplifier rather than to control the sector capacity, consideration is not given to the speech quality of the sector, the intensity of the pilot signal, the abnormal call release caused by the increase of the sector capacity, etc. Accordingly, the sector capacity may be in saturation before the high-power amplifier is overloaded.

As described above, the decrease of the sector capacity due to the increase of the subscribers causes the estimation and the proper control of the speech quality of the sector not to be performed. In the worst case, the pilot signal of the sector may disappear, and thus the sector may be in an unserviceable state. This results in release of the calls being served, thereby deteriorating the reliability of the whole communication system.

SUMMARY OF THE INVENTION

Accordingly, the present invention is directed to a call control method in base stations of a mobile radio communication system that substantially obviates one or more of the problems due to blockations and disadvantages of the related art.

An object of the present invention is to provide a call control method in a base station of a mobile radio communication system which can maintain the forward load in a sector below a predetermined level even when the forward sector capacity is overloaded by estimating the forward power utilizing the power of activated traffic channels allocated to the sector during the control of the originating and terminating calls in the mobile radio communication system.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the call control method in a base station of a mobile radio communication system includes the steps of calculating a forward sector excess capacity from a forward power of a sector for a predetermined period, determining at least a call and/or handoff call attempt block threshold value using the calculated forward sector excess capacity, and allocating a call and/or handoff call by comparing the call and/or handoff call attempt block threshold value with the forward sector excess capacity value when a certain mobile unit requests a call allocation.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 4 is a flowchart explaining the normal and handoff call controlling process in a mobile radio communication system according to the present invention.

DETAILED DESCRIPTION OF THE PREFERRED EMBODIMENT

Reference will now be made in detail to the preferred embodiment of the present invention, examples of which are illustrated in the accompanying drawings.

The base station of a mobile radio communication incorporating the method according to the present invention includes a selector/vocoder module 101 for performing a voice process and allocating forward traffic channel gains, a plurality of traffic channel elements 102 for calculating the respective allocated powers, and a base station processor (BSP) 103 for calculating the forward power of the sector using the allocated power values received from the traffic channel elements 102 and controlling the sector capacity accordingly.

Figure 2:
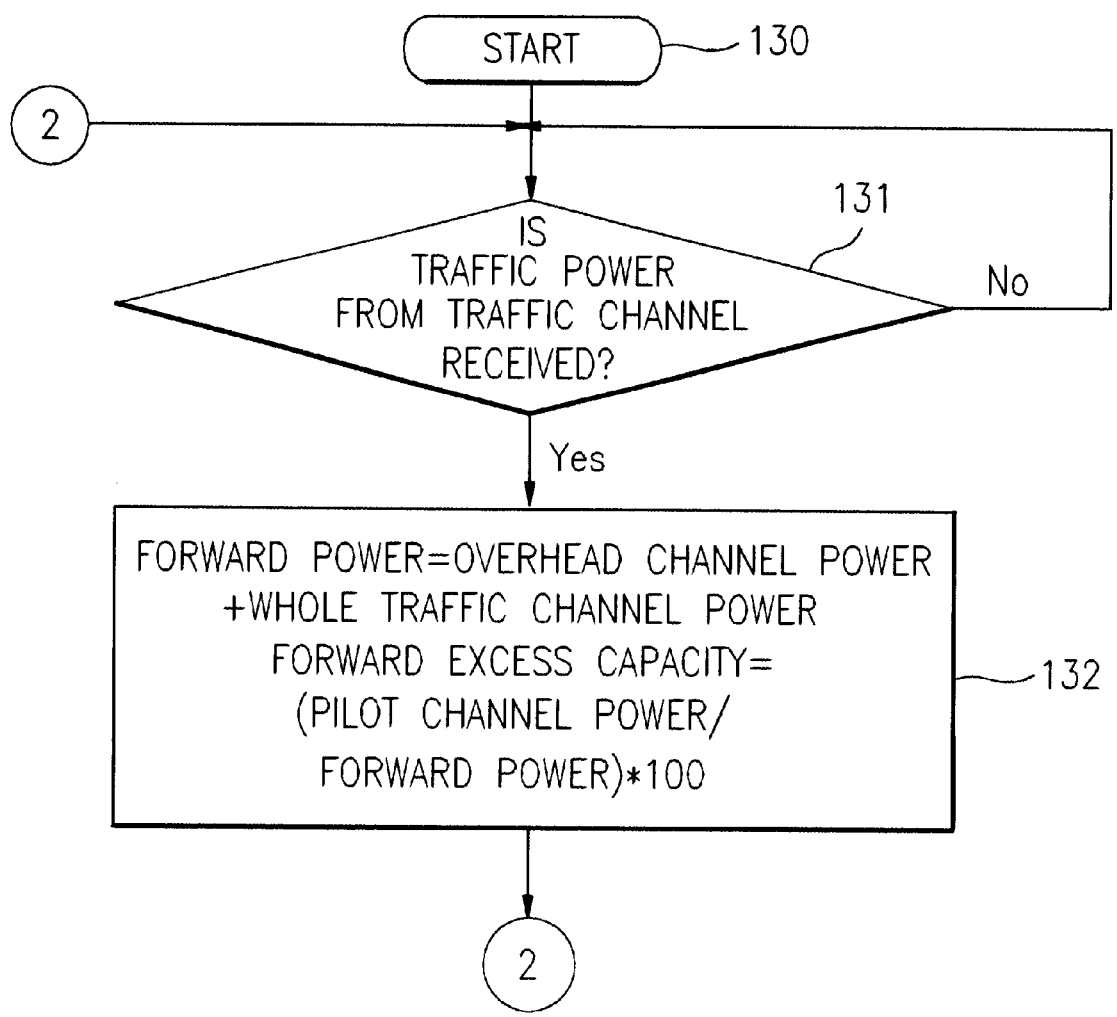
FIG. 2 is a flowchart explaining the excess capacity calculating process according to the present invention.
Figure 3:
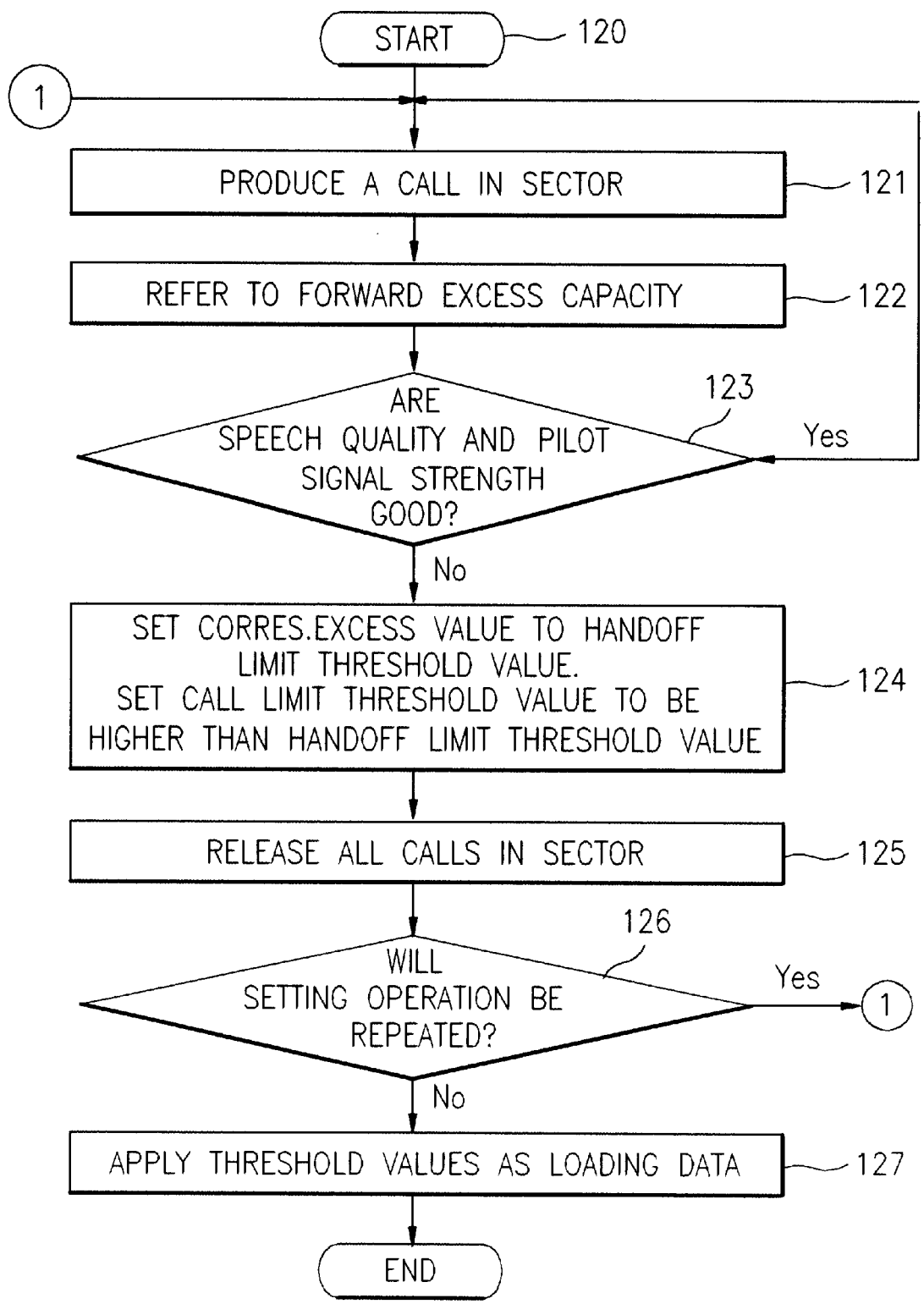
FIG. 3 is a flowchart explaining the threshold value determining process according to the present invention.

FIG. 2 is a flowchart explaining the excess capacity calculating process according to the present invention, FIG. 3 is a flowchart explaining the threshold value determining process according to the present invention, and FIG. 4 is a flowchart explaining the normal and handoff call controlling process in a mobile radio communication system according to the present invention.

According to the present invention, the base station of a digital cellular system or mobile radio communication system using the CDMA mobile radio communication technique maintains a uniform speech quality with respect to the calls in a specified sector, and prevents the release of calls being served which is due to the excess capacity of the sector. Specifically, the forward sector capacity is calculated by estimating the allocated forward power from the channel in use, and the specified service such as the call attempt request, handoff attempt request, etc., is blocked or allowed based on the calculated forward sector capacity, so that the forward load in the sector is kept below a predetermined level.

The call control method, i.e., the sector capacity control method in a mobile radio communication system according to the preferred embodiment of the present invention is performed as follows:

First, the forward power is estimated, and the forward sector excess capacity is calculated as shown in FIG. 2. Thereafter, the call attempt block threshold value and the handoff attempt block threshold value are set based on the calculated forward sector excess capacity as shown in FIG. 3. At this time, if a certain mobile unit requests a call allocation, the allocation of the call or the handoff call is performed in accordance with the comparison result of the corresponding sector excess capacity value with the call attempt block threshold value and the handoff attempt block threshold value as shown in FIG. 4.

The process of calculating the forward sector excess capacity value according to the present invention will be explained in detail with reference to FIG. 2.

Figure 1:
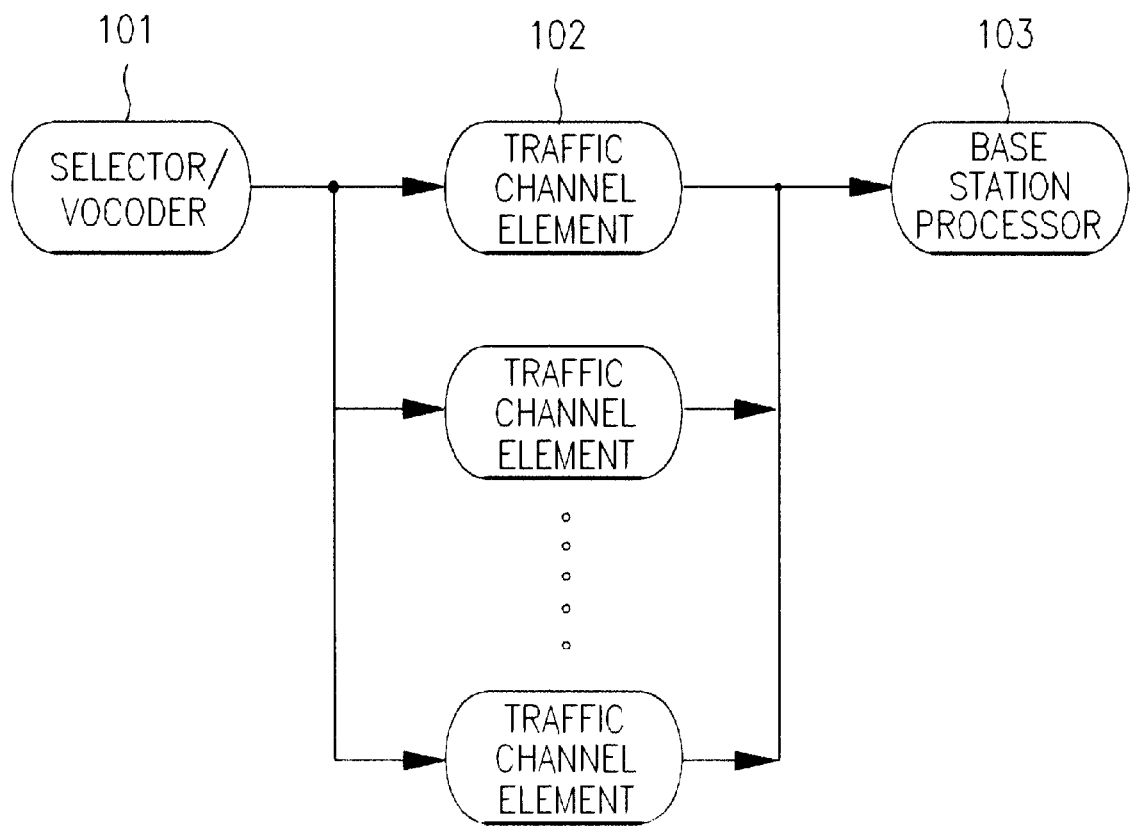
FIG. 1 is a block diagram illustrating the internal construction of a conventional mobile radio communication system.

The sector forward power is the sum of the overhead channel (pilot, paging, and synch channel) power and the whole activated traffic channel power. The overhead channel power is a fixed value allocated at an initial state of the base station, and the traffic channel power increases or decreases for each frame owing to the gain obtained by the power control, voice activity, and power control subchannel. Here, the overhead channel power and the traffic channel power are fixed values of the base station, and thus are not varied. The respective traffic channel element 102 calculates the traffic channel powers for each frame of 20ms, filters the calculated powers at predetermined intervals, and reports the filtered powers to the base station processor 103 as shown in FIG. 1. The base station processor 103 receives and adds the traffic channel powers from the respective traffic channels of the corresponding sector, and then calculates the sector forward power by adding the overhead channel power to the sum of the traffic channel powers. The forward sector excess capacity value is determined by the ratio of the pilot channel power to the sector forward power, and represented by a percentage (step 132). The base station processor 103 performs such a forward excess capacity calculation process at predetermined intervals regardless of the call control.

Here, if it is presumed that the forward sector excess capacity in case of no load is 100, the forward sector excess capacity is decreased as the calls are increased. The forward sector excess capacity value, whereby a uniform speech quality is maintained and calls can be allowed at maximum in consideration of the reserve power reserved for the handoff, is determined as the call attempt block threshold value.

The calls produced in the sector may be blocked due to the call attempt block threshold value, but the handoff request from other mobile units located in an adjacent sector can be allowed until the forward sector excess capacity becomes smaller than the handoff attempt block threshold value. The handoff attempt block threshold value is determined to be smaller than the call attempt block value. The fact that the forward sector excess capacity is equal to or smaller than the handoff attempt block threshold value means that the sector has the maximum allowable capacity for the calls currently in use and the handoff calls. The call attempt block threshold value and the handoff attempt block threshold value, which are determined based on the forward sector excess capacity, can be more accurately set by the experiments repeated several times.

Hereinafter, the process of obtaining the forward excess capacity value on condition that the current overhead channel power is given below and calls are produced over five cells as below will now be explained.

| | |
|---|---|
| pilot channel power | 11664 |
| paging channel power | 4225 |
| synch channel power | 9216 |
| traffic channel power | first cell:2500 |
| | second cell:4000 |
| | third cell:4900 |
| | fourth cell:6400 |
| | fifth cell:3000 |

Under the above condition, the overhead channel power is the sum of the pilot channel power, the paging channel power, and the synch channel power, that is, (11664+4225+9216=25105).

Also, the whole traffic channel power is the sum of the five traffic channel powers, that is, 20800(=2500+4000+4900+6400+3000).

Accordingly, the forward sector excess capacity value, which is the ratio of the pilot channel power to the sector forward power, is (11664/45905)*100=25.40.

Referring now to FIG. 3, the process of determining the call attempt block threshold value and the handoff attempt threshold value based on the forward sector excess capacity will now be explained.

First, a call is produced in a sector of an experimental base station to calculate the threshold value as shown in FIG. 3 (step 121). Thereafter, the speech quality and the pilot signal strength of the produced call are judged (step 123) with reference to the calculated forward excess capacity as shown in FIG. 2 (step 122).

At this judgment step, if it is judged that the speech quality and the pilot signal strength of the produced call are good, another call is produced. Specifically, the base station processor 103 judges the excess capacity value at the time when the speech quality of the call in the sector is inferior and the strength of the pilot signal becomes so weak that it cannot reach a predetermined level to be the minimum excess capacity of the sector by repeatedly performing the steps 122 and 123, and then determines this excess capacity value as the handoff block threshold value. Also, the base station processor 103 determines the call block threshold value to be higher than the handoff block threshold value by reserving the call block threshold value as much as the capacity for allowing the handoff (step 124).

Thereafter, the base station processor 103 releases all the calls in the sector (step 125), and judges whether to repeatedly perform the experiment (step 126). If so, it goes to the step 121, while otherwise, it applies the value to the threshold value loading data.

Referring now to FIG. 4, the process of blocking the calls or handoff calls in accordance with the result of comparing the sector excess capacity value calculated and determined by the method as shown in FIGS. 2 and 3 with the respective threshold values.

When the terminating or originating call attempt request is received from an exchange or a mobile unit, the base station judges whether this call is the call or the handoff call (step 141). If the requested call is the call , the base station judges whether to block the call by comparing the call attempt block threshold value with the forward sector excess capacity value (step 142).

Meanwhile, if the requested call is the handoff call, the base station judges whether to block the call by comparing the handoff call attempt block threshold value with the forward sector excess capacity value (step 143).

At the judgment step 142, if the call attempt block threshold value is greater than the forward sector excess capacity value, the base station refuses the call allocation request (step 145), while if the call attempt block threshold value is smaller than the forward sector excess capacity value, the base station performs the call allocation (step 144).

Meanwhile, at the judgment step 143, if the handoff call attempt block threshold value is greater than the forward sector excess capacity value, the base station refuses the handoff call allocation request (step 147), while if the handoff call attempt block threshold value is smaller than the forward sector excess capacity value, the base station performs the call allocation (step 146).

As described above, according to the present invention, since an accurate sector load can be measured by estimating the excess capacity of the sector using the forward power, the sector load can be maintained at a uniform level, thereby stably operating the system. Also, since the call attempt block threshold value and the handoff attempt block threshold value can be determined by experiments in consideration of a desired speech quality, the number of subscribers to be served may be somewhat reduced, but the speech quality for the whole subscribers can be estimated and controlled.

It will be apparent to those skilled in the art that various modifications and variations can be made in the call control method in a base station of a mobile radio communication system of the present invention without departing from the spirit and scope of the invention. Thus, it is intended that the present invention covers the modifications and variations of this invention provided they come within the scope of the appended claims and their equivalents.

What is claimed is:

1. A call control method in a base station of a mobile communication system, comprising:

calculating a forward sector excess power capacity for a prescribed period of time;

producing a first call in a sector of the base station to calculate a the call and/or a handoff call attempt block threshold value;

judging at least one of a speech quality and a pilot signal strength of the produced first call using the calculated forward sector excess power capacity;

determining at least one of a call and a handoff call attempt block threshold value according to a result of the judgment of the speech quality and the pilot signal strength; and comparing the corresponding block threshold value with the forward sector excess power capacity value when a mobile terminal requests a call allocation.

2. The method of claim 1, wherein the forward sector excess power capacity value comprises a ratio of a pilot channel power to the sector forward power.

3. A call control method in a base station of a digital mobile radio communication system, comprising:

identifying whether or not the traffic power has been received from a traffic channel of a sector for a prescribed period of time;

continuously determining whether or not the traffic power has been received from a traffic channel if the traffic power has not been received;

calculating a forward power if the traffic power has been received;

calculating a forward sector excess power capacity from the forward power;

determining at least one of a call and a handoff call attempt block threshold value using the calculated forward sector excess power capacity; and allocating the at least one of the call and the handoff call attempt block threshold value by comparing the call and/or a handoff call attempt block threshold value with the calculated forward sector excess power capacity in case of call allocation request from an arbitrary mobile station.

4. The method of claim 3, wherein determining at least one of the call and handoff call attempt block threshold value comprises:

producing a call in the sector of the base station to calculate the call and/or a handoff call attempt block threshold value;

judging a speech quality and a signal strength of a pilot channel; and determining at least one of the call and a handoff call attempt block threshold value according to a result of the judgment of the speech quality and a signal strength of the pilot channel.

5. The method of claim 3, wherein determining at least one of the call and handoff call attempt block threshold value comprises:

determining the forward sector excess capacity value as the a handoff block threshold value if it is judged that a speech quality and a signal strength of a pilot channel are weak; and determining the call block threshold value to be higher than the handoff block threshold value by reserving the call block threshold value as much as the capacity for allowing the handoff.

6. The method of claim 3, wherein determining at least one of the call and handoff call attempt block threshold value comprises:

releasing all calls in the sector after the call and/or a handoff call attempt block threshold value is determined;

judging whether or not to apply a threshold value; and applying the threshold value as a threshold value loading data according to a result of the judgment.

7. The method of claim 3, wherein determining at least one of the call and handoff call attempt block threshold value further includes the substep of repeating the step of calculating the forward sector excess power capacity from the forward power of the corresponding sector for a predetermined period if the threshold value loading data is not applied as a result of the judgment.

8. The method of claim 3, wherein determining at least one of the call and handoff call attempt block threshold value comprises producing another call in the sector of the base station and identifying a speech quality and a signal strength of a pilot channel if the speech quality and the signal strength of the pilot channel are good.

9. The method of claim 3, wherein the forward sector excess power capacity value comprises a ratio of a pilot channel power to the sector forward power.

10. A call control method in a base station of a mobile communication system, wherein the improvement comprises a mobile system having a selector/vocoder module, configured to process a voice signal and allocate forward traffic channel gains, a plurality of traffic channel elements coupled to receive an output of the selector/vocoder module and calculate respective allocated powers, and a base station processor coupled to receive an output of each of the plurality of traffic channel elements and calculate the forward power of the sector using the allocated power values received from each of the plurality of traffic channel elements to control the sector capacity, wherein the base station processor further calculates a forward sector excess power capacity value.

11. The method of claim 10, wherein the base station processor calculates a forward sector excess power capacity from a forward power of a sector for a prescribed period of time, produces a first call in the sector of the base station to calculate a call and/or handoff call attempt block threshold value, judges at least one of a speech quality and a pilot signal strength of the produced first call using the calculated forward sector excess power capacity, determines the call and/or handoff call attempt block threshold value according to a result of the judgment of the speech quality and the pilot signal strength and allocates at least one of a call and a handoff call by comparing the corresponding block threshold value with the forward sector excess power capacity value when a mobile terminal requests a call allocation.

12. The method of claim 10, wherein the base station processor calculates a forward sector excess power capacity from a forward power of a sector for the prescribed period of time, determines at least one of a call and a handoff call attempt block threshold value using the calculated forward sector excess power capacity, and allocates at least one of a call and a handoff call by comparing the corresponding block threshold value with the forward sector excess power capacity value when a mobile terminal requests a call allocation.

13. The method of claim 10, wherein the forward sector excess power capacity value is determined by a ratio of a pilot channel power to the sector forward power.

14. A call control method in a base station of a digital mobile radio communication system, comprising:

calculating a forward sector excess power capacity from a forward power of a sector for a predetermined period;

determining at least one of a call and a handoff call attempt block threshold value using the calculated forward sector excess power capacity; and allocating at least one of a call and a handoff call by comparing the corresponding block threshold value with the forward sector excess power capacity value when a certain mobile unit requests a call allocation.

15. The call control method as claimed in claim 14, wherein the step of determining the call and/or the handoff call attempt block threshold value comprises:

producing a first call in the sector of the base station to calculate the call and/or the handoff call attempt block threshold value;

judging a speech quality and a lot signal strength of the produced first call using the calculated foward sector excess power capacity; and determining the call and/or the handoff call attempt block threshold value according to a result of the judgment of the speech quality and the pilot signal strength.

16. The call control method as claimed in claim 15, wherein the step of determining the call and/or the handoff call attempt block threshold value further comprises:

producing a second call in the sector of the base station and identifying the speech quality and the pilot signal strength of the second call if the speech quality and the pilot signal strength of the first call meet a first prescribed condition.

17. The call control method as claimed in claim 15, wherein the step of determining the call and/or the handoff call attempt block threshold value further comprises:

determining the forward sector excess power capacity value as the the handoff block threshold value if it is determined that the speech quality and the plot signal strength of the first call meet a second prescribed condition.

18. The call control method as claimed in claim 15, wherein the step of determining the call and/or a handoff call attempt block threshold value further comprises:

releasing all calls in the sector after the call and/or handoff call attempt block threshold value are/is determined;

determining whether or not to apply the threshold value; and applying the threshold value as a threshold value loading data according to a result of the judgment.

19. The call control method as claimed in claim 18, wherein the step of determining the call and/or a handoff call attempt block threshold value further comprises repeating the step of calculating the forward sector excess power capacity from the forward power of the corresponding sector for a predetermined period if the threshold value loading data is not applied as a result of the judgment.

20. The call control method as claimed in claim 14, wherein the step of calculating the forward sector excess power capacity comprises:

identifying whether the traffic power has been received from a traffic channel; and calculating the forward sector excess power capacity according to the received traffic power.

21. The call control method as claimed in claim 20, wherein the step of calculating the forward sector excess power capacity further comprises:

obtaining a forward power if the traffic power has been received; and obtaining the forward sector excess power capacity using the obtained forward power.

22. The call control method as claimed in claim 20, wherein the step of calculating the forward sector excess power capacity further comprises identifying at predetermined intervals whether or not the traffic power has been received from the traffic channel.

23. The call control method as claimed in claim 14, wherein the step of allocating the call and/or a handoff call comprises:

judging whether the call attempt request is for the call or the handoff call; and determining whether to allocate the call by comparing the forward sector excess power capacity with the call attempt block threshold value according to a result of the judgment.

24. The call control method as claimed in claim 23, wherein if the call request is for the call, the call allocation determining step comprises:

refusing the call allocation request if the call attempt block threshold value meets a third predetermined condition, and performing the call allocation if the call attempt block threshold value is smaller than the forward sector excess power capacity value.

25. The call control method as claimed in claim 24, wherein the third condition means that the call attempt block threshold value is greater than the forward sector excess power capacity value.

26. The call control method as claimed in claim 23, wherein if the call request is for the handoff call, the call allocation determining step comprises:

refusing the handoff call allocation request if the handoff call attempt block threshold value meets a fourth condition, and performing the handoff call allocation if the handoff call attempt block threshold value is smaller than the forward sector excess power capacity value.

27. The call control method as claimed in claim 26, wherein the fourth condition means that the handoff call attempt block threshold value is greater than the forward sector excess power capacity value.

28. The method of claim 14, wherein the forward sector excess power capacity value comprises a ratio of a pilot channel power to the sector forward power.

* * * * *